(12) United States Patent
Asa

(10) Patent No.: US 8,100,773 B2
(45) Date of Patent: Jan. 24, 2012

(54) JOINT

(75) Inventor: Yukihiro Asa, Kodaira (JP)

(73) Assignee: ASA Electronics Industry Co., Ltd, Tokyo (JP)

( * ) Notice: Subject to any disclaimer, the term of this patent is extended or adjusted under 35 U.S.C. 154(b) by 292 days.

(21) Appl. No.: 12/066,571

(22) PCT Filed: Nov. 27, 2006

(86) PCT No.: PCT/JP2006/323591
§ 371 (c)(1),
(2), (4) Date: Mar. 12, 2008

(87) PCT Pub. No.: WO2007/077695
PCT Pub. Date: Jul. 12, 2007

(65) Prior Publication Data
US 2009/0191975 A1   Jul. 30, 2009

(30) Foreign Application Priority Data

Dec. 28, 2005   (JP) ................................. 2005-376872

(51) Int. Cl.
*F16D 3/221* (2006.01)
(52) U.S. Cl. ...................................... 464/141
(58) Field of Classification Search .................. 464/140, 464/141
See application file for complete search history.

(56) References Cited

U.S. PATENT DOCUMENTS

| | | | | |
|---|---|---|---|---|
| 1,620,285 A | * | 3/1927 | Pollak | 464/141 |
| 2,033,583 A | * | 3/1936 | McCarrell | 464/141 |
| 3,153,920 A | * | 10/1964 | Ireland | 464/140 |
| 4,156,354 A | | 5/1979 | Krude | |
| 5,160,299 A | * | 11/1992 | Sweeney | 464/141 |
| 5,217,410 A | | 6/1993 | Schwarzler | |

FOREIGN PATENT DOCUMENTS

| | | | |
|---|---|---|---|
| GB | 270795 | * | 5/1927 |
| GB | 329900 | * | 5/1930 |
| GB | 2131519 | | 6/1984 |
| JP | 53-17860 | | 2/1978 |
| JP | 59-113322 | | 6/1984 |
| JP | 65024/1991 | | 6/1991 |
| JP | 4-78323 A | * | 3/1992 |
| JP | 04-236823 | | 8/1992 |
| JP | 11-280779 | | 10/1999 |
| JP | 2000-27881 | | 1/2000 |

OTHER PUBLICATIONS

International Search Report mailed Feb. 27, 2007 in parallel PCT application No. PCT/JP2006/323591, 2 pages.

* cited by examiner

*Primary Examiner* — Gregory Binda
(74) *Attorney, Agent, or Firm* — Michael A. Glenn; Glenn Patent Group

(57) ABSTRACT

A joint whose number of parts is reduced and whose production process is simplified. The joint has spherical bodies (29a-29d), a circular cylindrical inner hub (20) in which hemispherical receiving sections (22a-22d) for receiving the spherical bodies (29a-29d) are formed in curved surfaces, and an outer hub (10) that has a receiving section (17) for receiving the inner hub (20) and also has longitudinal grooves (12a-12d) integrally formed with the receiving section (17) and in which the spherical bodies (29a-29d) received in the receiving sections (22a-22d) are received.

5 Claims, 6 Drawing Sheets

JOINT

FIELD OF THE INVENTION

The invention relates to a joint for use in a power transmission part for automobiles, aircrafts, marine vessels or industrial machinery or the like.

BACKGROUND OF THE INVENTION

Conventionally, there has been disclosed "a sliding constant velocity joint comprising
 an outer ring member which is provided with axially extending track grooves at circumferential directional equally divided positions of an inner perimeter surface,
 an inner ring member which is provided with axially extending track grooves at circumferential directional equally divided positions of an outer perimeter surface, and
 a torque transmitting part interposed between the inner/outer ring members,
 wherein the torque transmitting part is constituted by a journal member provided with a gear part and a roller rotatably supported on the journal member,
 wherein the roller is received in the track grooves of the outer ring member,
 wherein a gear part is provided on a bottom face of the track grooves of the inner ring member, and
 wherein the gear part of the journal member is engaged with the gear part of an inner ring member, so that the journal member can incline relative to the inner ring member." (See Japanese Patent Laid-Open No. 2000-27881).

BRIEF DESCRIPTION OF THE DRAWINGS

FIG. 2 (*b*) is a side view of the inner hub 20 seen from a head 21 side.

FIG. 2 (*c*) is an enlarged view near a sphere receiver 22*a* in FIG. 2 (*b*).

FIG. 3 (*b*) is a cross section of the outer hub 10.

FIG. 3 (*c*) is a side view of the outer hub 10 seen from a receiving section 17 side.

FIG. 4 (*b*) is a side view of the outer hub 10 seen from the receiving section 17 side.

FIG. 4 (*c*) is a view showing a state where the outer hub 10 is coupled with the inner hub 20. In addition, the example where the number of spheres is 6 is shown here.

FIG. 5 (*b*) is a cross section of the outer hub 10.

FIG. 5 (*c*) is a side view of the outer hub 10 seen from a receiving section 17 side.

FIG. 6 (*b*) is a side view of the outer hub 10 seen from the receiving section 17.

FIG. 6 (*c*) is a side view and a cross section of the joint member 20.

FIG. 6 (*d*) is a plane view of the joint member 20.

FIG. 6 (*e*) is a view showing a state where the outer hubs 10, 10' are connected to each other through the joint member 20 and axes of the outer hubs 10, 10' are made eccentric from each other.

FIG. 7 (*b*) is peripheral edges of the outer hub 10 are provided with a step, this step is touched by the tip of the jigs 51-54 at a given angle.

FIG. 7 (*c*) is the outer peripheral portions corresponding to longitudinal grooves 12*a*-12*d* are crushed.

FIG. 7 (*d*) is the outer peripheral portions corresponding to longitudinal grooves 12*a*-12*d* are crushed.

FIG. 9 (*b*) is a view showing an example where the diameters of shafts 30, 40 are larger than the diameters of the openings 15, 25.

FIG. 9(*c*) is a variation of FIG. 9(*b*).

FIG. 11 (*b*) is an explanatory diagram of the assembling principle of each member shown in FIG. 10.

FIG. 11 (*c*) is an explanatory diagram of the assembling principle of each member shown in FIG. 10.

FIG. 11 (*d*) shows one part of the cross section of the outer hub 10.

DISCLOSURE OF THE INVENTION

Problems to be Solved by the Invention

The joint described in the Patent Literature 1 includes a torque transmitting part apart from the outer ring member and the inner ring member. The torque transmitting part is constituted by a journal member provided with a gear part and a roller rotatably supported on the journal member. In addition, the gear part of the journal member is engaged with the gear part of the inner ring member during the manufacturing process.

Thus, the above joint has problems in that the number of parts is large, and in that a troublesome engaging process is necessary during manufacturing.

Thus, the object of the present invention is to provide a joint which can solve the above problems.

Means for Solving the Problems

To solve the above problems, the joint of the present invention comprises:
 a plurality of spheres (for example, 29*a*-29*d* in FIG. 1);
 a member (for example, 20 in FIG. 1) wherein hemispherical recesses for receiving the spheres (for example, 22*a*-22*d* in FIG. 2) are formed on a side face of a head (for example, 21 in FIG. 2) and a cylindrical body (for example, 24 in FIG. 2) is located in the head via a neck (for example, 23 in FIG. 2); and
 a hub (for example, 10 in FIG. 1) having a receiving section for receiving the member (for example, 17 in FIG. 1), and a plurality of longitudinal grooves (for example, 12*a*-12*d* in FIG. 2) which are formed integrally with said receiving section and in which the sphere received in the each recess is received.

Figure 1:
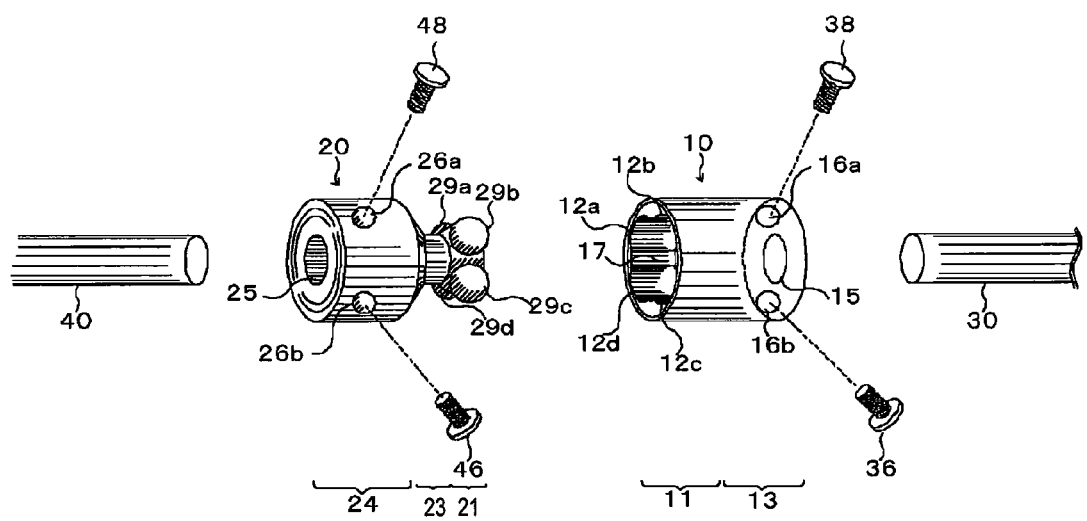
FIG. 1 is an exploded perspective view of a joint according to an embodiment 1 of the present invention.

The member may be integrally formed with another hub coupled with the hub (for example, 10 FIG. 1). In other words, the member may construct one part of the other hub.

Figure 6:
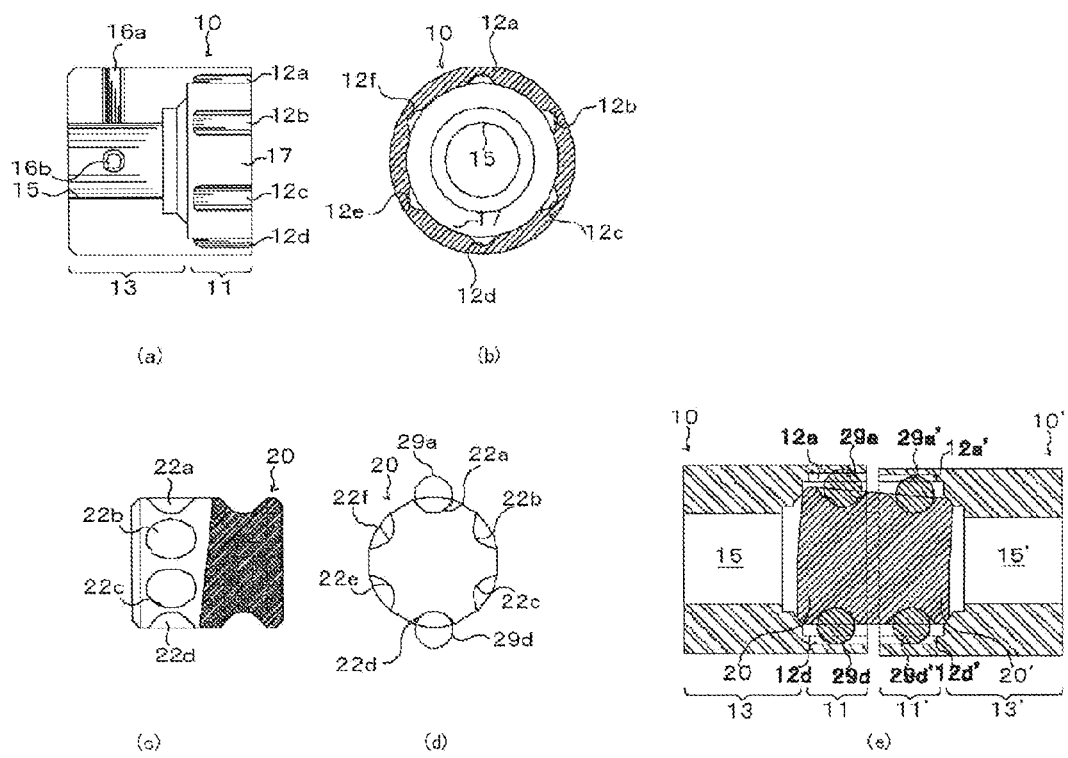
FIG. 6 (*a*) is a cross section of the outer hub 10.

Or, the member may be received between two hubs (for example, 10, 10' in FIG. 6). In this case, the member may be preferably provided with recesses for receiving spheres received in each longitudinal groove of the hub and spheres received in another hub coupled with the hub.

Figure 4:
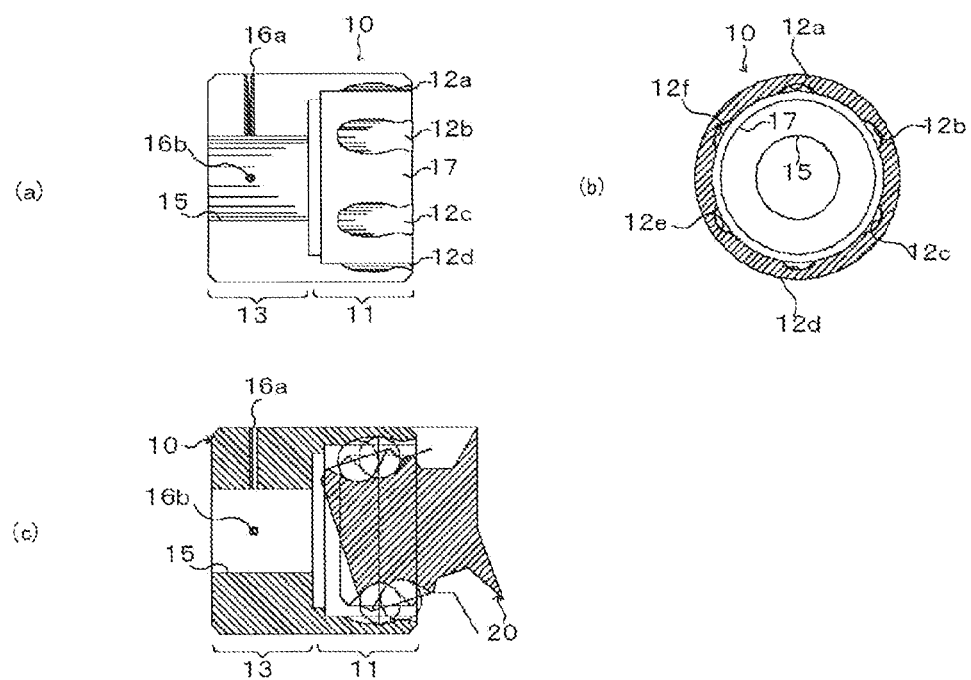
FIG. 4 (*a*) is a cross section of the outer hub 10 according to an embodiment 2 of the present invention.

In a bottom of the longitudinal groove, the depth at an opening portion may be preferably shallower than that at a central portion (for example, a shape shown in 12a-12d in FIG. 4). As a result, the sphere is stopped by said opening portion, so the member and the hub are hard to detach from each other during use.

Figure 9:
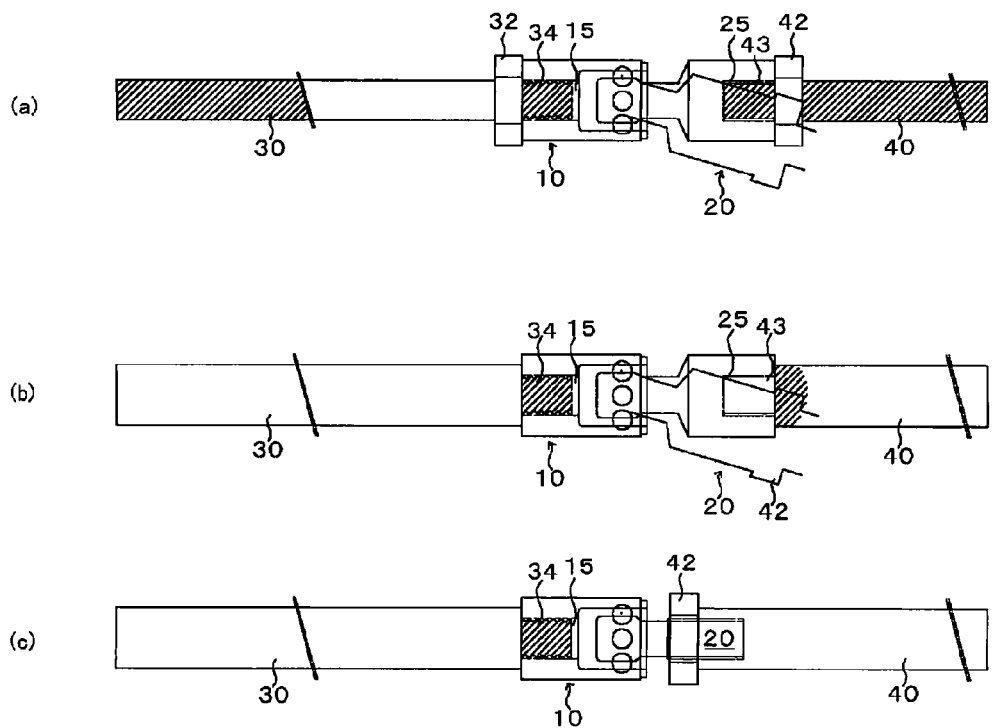
FIG. 9 (*a*) is a view showing an example where the diameters of shafts 30, 40 are less than or equal to those of the openings 15, 25.

The hub and a shaft coupled to said hub may be coupled by threading (for example, a structure shown in 34 in FIG. 9). This is preferably used particularly when the main body of the joint is small.

In addition, it is preferable that a diameter of the each sphere is in a range of generally ¼-⅛ of the body's diameter, in consideration of durability of each sphere. Within this range, stress on each sphere in use of the joint does not become excessive so as to influence durability.

In addition, a prevention part for preventing the member and the hub from detaching from each other may be provided. There are several types of prevention parts. The type to be used may be selected by the wall thickness between the bottom face of the longitudinal groove of the hub and an outer wall of the hub.

DETAILED DESCRIPTION OF THE INVENTION

Embodiments of the invention will be described with reference to the drawings.

Embodiment 1

FIG. 1 is an exploded perspective view of a joint according to an embodiment 1 of the present invention. The joint shown in FIG. 1 is roughly classified into an outer hub 10, an inner hub 20, spheres 29a-29d, and shafts 30, 40, which will be described below.

In order to couple the outer hub 10 to the inner hub 20, a head 21 (FIG. 2) of the inner hub 20 is received in a receiving section 17 formed in the outer hub 10.

As discussed below, the inner hub 20 is constituted so that hemispherical recesses for receiving the spheres 29a-29d are formed on a side face of the head 21 and a cylindrical body 24 is located in the head 21 via a neck 23. In a bottom face of the body 24, an opening 25 is formed so as to receive the shaft 40.

The outer hub 10 has the receiving section for receiving the inner hub 20, and a plurality of longitudinal grooves which are formed integrally with said receiving section and in which the sphere received in said each recess is received.

The spheres 29a-29d are composed of, for example, magnetic substances such as stainless, ceramic, metal or the like, and their sizes are of the order of 4φ (φ: diameter) when the size of the joint itself is that of the following examples. The number of spheres 29a-29d is not limited to 4. Generally, the number of spheres 29a-29d may be determined depending on the size of the main body of the joint and material (hardness). In addition, the diameter of spheres 29a-29d may range from generally ¼-⅛ of the diameter of the body 24 (FIG. 2) of the inner hub 20, in consideration of durability of spheres 29a-29d.

Figure 2:
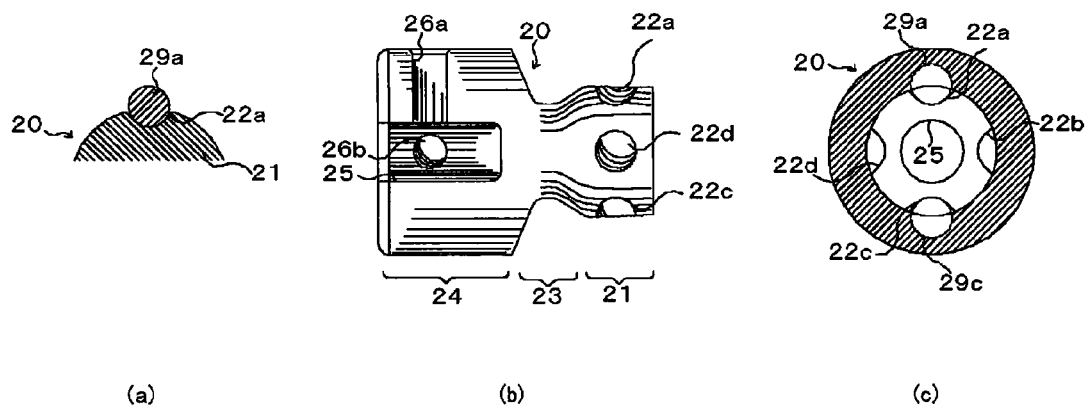
FIG. 2 (*a*) is a side view of the inner hub 20 in FIG. 1 seen from a screw hole 26*b* side.

FIG. 2 (a) is a side view of the inner hub 20 in FIG. 1 seen from a screw hole 26b side. FIG. 2 (b) is a side view of the inner hub 20 seen from a head 21 side. FIG. 2 (c) is an enlarged view near a sphere receiver 22a in FIG. 2 (b).

The inner hub 20 is made of plastic, metal or the like. The inner hub 20 includes an almost cylindrical head 21 in which hemispherical sphere receivers 22a-22d receiving a plurality of spheres 29a-29d are formed on a curved surface. In this case, a hemispherical shape also includes an almost conical shape (a shape having a V-shaped cross section shown in FIG. 2 (a)). Grease is applied between the spheres 29a-29d and the sphere receivers 22a-22d. The inner hub 20 includes the body 24 in which an opening 25 for receiving a shaft 40 is formed in the bottom face and screw holes 26a, 26b for receiving screws 46, 48 to screw the shaft 40 received in the opening 25 from its side face are formed in the side face. Further, the inner hub 20 includes the neck 23 which performs functions of connecting the head 21 to the body 24 and allowing a curve between shafts 30, 40.

In addition, an example of sizes of the inner hub 20 is as follows.

Head 21
- a diameter at an end face: 12.4 mm
- a diameter at a boundary with the neck 23: 12.7 mm
- a length: 6.7 mm
- a length of the end face to the bottom of sphere receivers 29a-29d: 3.7 mm
- a length from a shaft center to the bottom of sphere receivers 29a-29d: 4.47 mm
- a depth from the diameter at the boundary with the neck 23 to the bottom of sphere receivers 29a-29d: 1.88 mm
- an opening diameter of sphere receivers 29a-29d: 4.8-5.0 mm Neck 23
- a length from the boundary with the head 21 to a head 21 side of a small-diameter section: 2.8 mm
- a small-diameter section in diameter: 9.2 mm
- a length from the head 21 side of the small-diameter section to the boundary with the body 24: 4.5 mm
- an angle of the portion directed from the body 24 to the small-diameter section: 67 degrees Body 24
- a diameter: 20 mm
- a length: 13 mm
- a length from an end face to shaft centers of screw holes 26a, 26b: 5 mm
- a diameter of the opening 25: 5.7 mm
- a depth of the opening 25: 12 mm
- a diameter of the screw holes 26a, 26b: 3.35 mm In addition, the inner hub 20 may be die casted, but for example, sphere receivers 22a-22d may be also formed such as by excavating.

Figure 3:
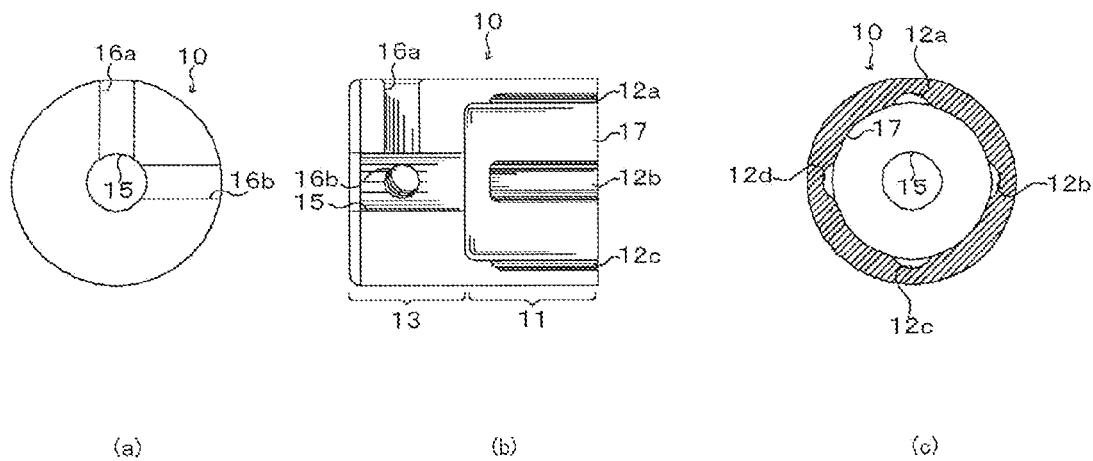
FIG. 3 (*a*) is a side view of the outer hub 10 in FIG. 1 seen from the opening 15 side.

FIG. 3 (a) is a side view of the outer hub 10 in FIG. 1 seen from the opening 15 side. FIG. 3 (b) is a cross section of the outer hub 10. FIG. 3 (c) is a side view of the outer hub 10 seen from a receiving section 17 side.

The outer hub 10 is made by plastic, metal or the like. The outer hub 10 includes a first part 11 which comprises a receiving section 17 receiving the head 21 of the inner hub 20, and a plurality of longitudinal grooves 12a-12d which are integrally formed to the receiving section 17 at constant intervals and in which spheres 29a-29d received in each sphere receiver 22a-22d are received. The outer hub 10 includes a second part 13 in which the opening 15 for receiving the shaft 30 is formed in the bottom face, and screw holes 16a, 16b receiving screws 36, 38 to screw the shaft 30 received in the opening 15 from its side face are formed in the side face. In addition, an example of sizes of the outer hub is as follows.

A first part 11:
a depth of the receiving section 17 of 13 mm,
a longitudinal length of longitudinal grooves 12a-12d of 10.5 mm,
a length from the bottom of the longitudinal groove 12a to the bottom of the longitudinal groove 12d of 17 mm,
A second part 13:
a diameter of 20 mm,
a length of 11 mm,
a length from the end face to the shaft center of screw holes 16a, 16b of 5 mm,
a diameter of the opening 15 of 5.7 mm,
a depth of the opening 15 of 11 mm,
a diameter of screw holes 16a, 16b of 3.35 mm.

If each size of the outer hub 10 and the inner hub 20 is changed so as to be substantially similar to the illustrated size, the overall size of the joint can be changed. However, if the difference between the hardness of the outer hub 10 and the inner hub 20 and the hardness of spheres 29a-29d is large, the number of spheres 29a-29d may be changed so that ones having a lower hardness do not deform in use of the joint. Generally, if the joint is increased, the number of spheres may be increased.

In addition, the outer hub 10 may be die casted, but for example, longitudinal grooves 12a-12d may be also formed such as by excavating.

Shafts 30, 40 are composed of stainless, ceramic or the like, and their sizes are of the order of the openings 15, 25, and of the order of 6φ when the size of the joint itself is that of the above examples.

Thus, the joint of the present embodiment comprises three parts: an outer hub 10, an inner hub 20, and spheres 29a-29d. Moreover, the joint of the present embodiment does not need a complicated structure. Even in the case of such a joint, a uniform velocity between coupling objects at the time of rotation has been confirmed.

Embodiment 2

FIG. 4 (a) is a cross section of the outer hub 110 according to an embodiment 2 of the present invention. FIG. 4 (b) is a side view of the outer hub 110 seen from the receiving section 117 side. FIG. 4 (c) is a view showing a state where the outer hub 110 is coupled with the inner hub 120. In addition, the example where the number of spheres is 6 is shown here.

As shown in FIG. 4, in this embodiment, a longitudinal central portion of the longitudinal grooves 112a-112f is relatively deeper than the opening portion. In such a outer hub 110, longitudinal grooves 112a-112f are formed as in the outer hub 10 shown in FIG. 3, and the central portion and the open end are opened such as by excavating.

In addition, when a hub 120 of the same size is used, the opening portion of longitudinal grooves 112a-112f of the outer hub 110 according to the embodiment 2 is not deeper than the opening portion of longitudinal grooves 12a-12d of the outer hub 10 according to the embodiment 1. Then, the central portion of longitudinal grooves 112a-112f of the outer hub 110 according to the embodiment 2 is for example excavated to a depth equal to that of longitudinal grooves 12a-12d of the outer hub 10 according to the embodiment 1.

Concretely, in the case of the outer hub 10 shown in FIG. 3, a length from the bottom of the longitudinal groove 12a to the bottom of the longitudinal groove 12d is 17 mm, whereas in the case of the outer hub 110 shown in FIG. 4, a length from the bottom of the opening portion of the longitudinal groove 112a to the bottom of the opening portion of the longitudinal groove 112d is 16.3 mm.

When the inner hub 120 is inclined around 35 degrees with respect to such an outer hub 110, the distance between spheres 129a, 129d in top and bottom direction in FIG. 4 (c) can be less than or equal to the distance between longitudinal grooves 112a, 112d. Therefore, by inserting the inner hub 20 into the receiving section 117 with an inclined state, the outer hub 10 can be coupled with the inner hub 120.

If, after the coupling between the inner hub 120 and the outer hub 110, the angle between the inner hub 120 and the outer hub 110 is lost, spheres 120a-129f are restricted by protruded portions between the central portion and the open end of the longitudinal grooves 112a-112f, thereby preventing the inner hub 120 and the outer hub 110 from detaching from each other. In addition, in use, if the angle between the inner hub 120 and the outer hub 110 is around 115 degrees, the coupling between the inner hub 120 and the outer hub 110 is secured.

As discussed above, a joint using the outer hub 110 according to the present embodiment is hard for the inner hub 120 and the outer hub 110 to detach from each other in use. Concretely, when the inner hub 120 and the outer hub 110 are rotated for around 2000 hours as their shaft centers are mutually inclined, in the case of around 15 degrees, they are not detached from each other.

Embodiment 3

Figure 5:
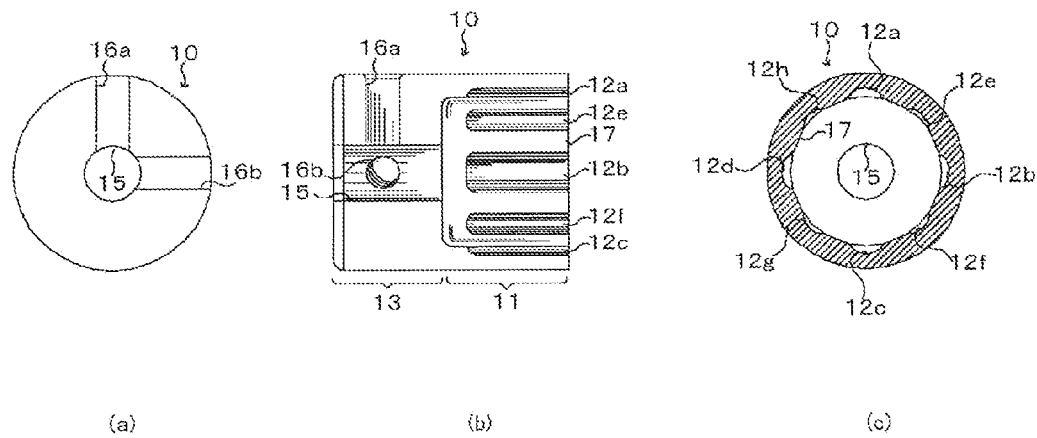
FIG. 5 (*a*) is a side view of the outer hub 10 in FIG. 1 seen from the opening 15 side.

FIG. 5 is a variation of FIG. 3. In the outer hub 210 shown in FIG. 5, eight longitudinal grooves 212a-212h in total are formed. This outer hub 210 is die casted.

Here, longitudinal grooves 212a-212d in FIG. 5 (b) which are located in the vertical or lateral positions are used without excavating the central portion as in the outer hub 10 shown in FIG. 3. On the other hand, longitudinal grooves 212e-212h which are located between longitudinal grooves 212a-212d in FIG. 5 (b) are used after excavating the central portion as in the outer hub 110 shown in FIG. 4. In addition, as has been indicated, longitudinal grooves 212a-212d are formed so as to be deeper than longitudinal grooves 212e-212h.

Thus, in this embodiment, the outer hub 10 is die casted so as to use as either type of outer hubs 10, 110 illustrated in the embodiments 1, 2. Therefore, the outer hub 210 shown in FIG. 5 is mass-produced, and longitudinal grooves 12e-12h may be machined depending on the application.

Embodiment 4

FIG. 6 is a view showing a joint of the type connecting two outer hubs 10, 10' through one joint member 20 to which a plurality of spheres are attached.

FIG. 6 (a) is a cross section of the outer hub 10. FIG. 6 (b) is a side view of the outer hub 10 seen from the receiving section 17. FIG. 6 (c) is a side view and a cross section of the joint member 20. FIG. 6 (d) is a plane view of the joint member 20. FIG. 6 (e) is a view showing a state where the outer hubs 10, 10' are connected to each other through the joint member 20 and axes of the outer hubs 10, 10' are made eccentric from each other.

The joint of each previously mentioned embodiment cannot structurally make the axes of shafts 30, 40 eccentric. On the other hand, the joint of the present embodiment can structurally make the axes of shafts 30, 40 eccentric, thereby making the axes of shafts 30, 40 eccentric.

Embodiment 5

Figure 7:
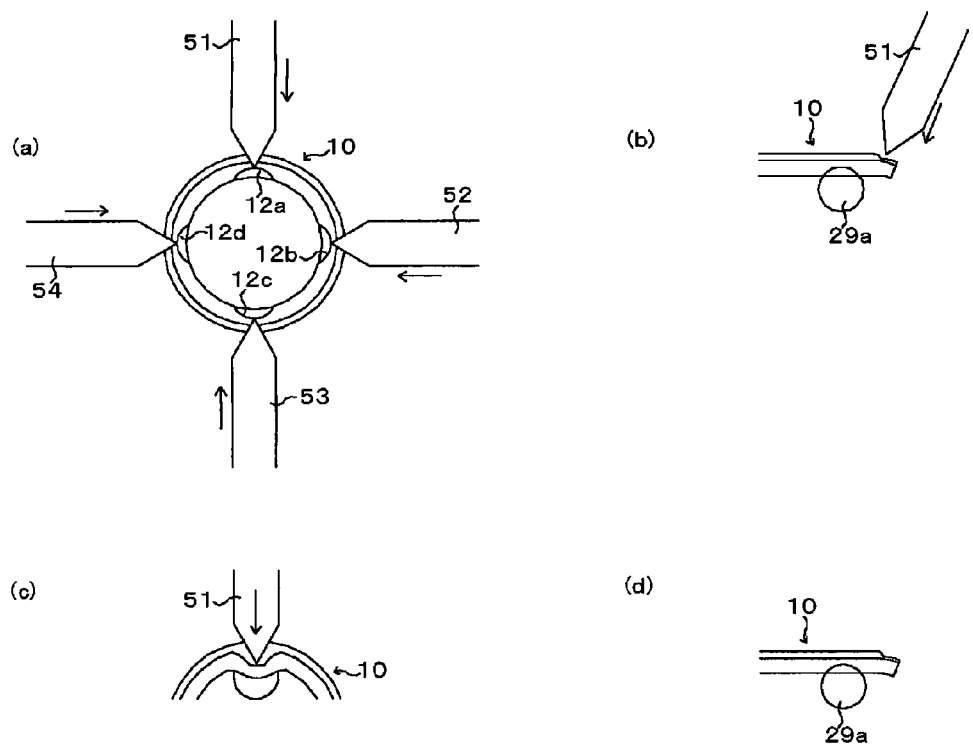
FIG. 7 (*a*) is outer peripheral portions corresponding to longitudinal grooves 12*a*-12*d* of the outer hub 10 are touched toward the shaft center of the outer hub 10 by jigs 51-54.

FIG. 7 is an explanatory diagram of a processing step of the outer hub 10 of type shown in FIG. 3. In this embodiment, in order to secure the coupling between the outer hub 10 and the inner hub 20 in use, after the outer hub 10 and the inner hub 20 are coupled, bottoms near the open ends of longitudinal grooves 12a-12d are crushed by means of jigs 51-54 such as punch.

Concretely, as shown in FIG. 7 (a), outer peripheral portions corresponding to longitudinal grooves 12a-12d of the outer hub 10 are touched toward the shaft center of the outer hub 10 by jigs 51-54 having a sharp tip. Here, as shown in FIG. 7 (b), peripheral edges of the outer hub 10 are provided with a step, this step is touched by the tip of the jigs 51-54 at a given angle.

And, in this state, an external force is added to the jigs 51-54 toward the shaft center of the outer hub 10. As a result, in the outer hub 10, as shown in FIG. 7 (c) and FIG. 7 (d), the outer peripheral portions corresponding to longitudinal grooves 12a-12d are crushed. The spheres in longitudinal grooves 12a-12d can arrive at the crushed part, but are restricted by said part. Therefore, the outer hub 10 and the inner hub 20 are not detached from each other.

Here, the technique shown in FIG. 7 is devised so that the outer hub 10 and inner hub 20 do not detach from each other. However, when the size of joint increases, the wall thickness from the bottom of longitudinal grooves 12a-12d to the outer perimeter surface of the outer hub 10 increases, the technique shown in FIG. 7 may not form an enough crushed part to such an extent that the outer hub 10 and the inner hub 20 do not detach from each other.

Figure 8:
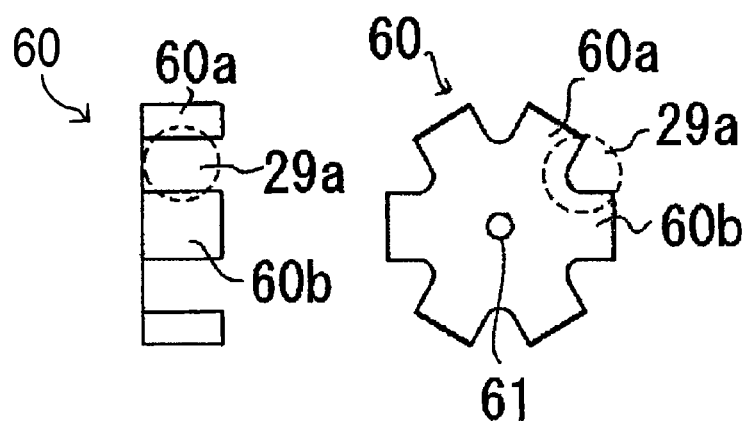

In this case, rather than preventing the outer hub 10 and the inner hub 20 from detaching from each other, as shown in FIG. 8, spheres needs not to be detached from sphere receivers even if the outer hub 10 is detached from the inner hub 20.

If the cover 60 is attached to the inner hub 20 as discussed above, the sphere 29a stays at an interval between the piece parts 60a, 60b, as illustrated, and thus is prevented from dropping.

Embodiment 6

FIG. 9 is a view showing an attaching state of shafts 30, 40 with respect to joints of various sizes. FIG. 9 (a) is a view showing an example where the diameters of shafts 30, 40 are less than or equal to those of the openings 15, 25. In this case, as shown in FIG. 9 (a), first, the tips 34, 43 of the shafts 30, 40 are screw-cut such that screw holes are formed in the opening 15, 25. Then, the tips 34, 43 are coupled with the joint by screwing with nuts 32, 42. In this case, in the outer hub 10, the receiving sections 17 and the opening 15 are integrally formed, so in order to position the shaft 30 to the outer hub 10, it is required to use a nut 32. On the other hand, in the inner hub 20, since the opening 25 has the bottom, it is not required to use a nut 42, but the nut 42 may be used for the purpose of the robust coupling between the inner hub 20 and the shaft 40.

The coupling technique as shown in FIG. 9 (a) is effective if the joint and the diameters of the shafts 30, 40 are small. If diameters of the joint or the like are small, an interval between the side face of the inner hub 20 or the like and the opening 25 is thin and thus forming the screw hole 26a or the like shown in FIG. 1 in the inner hub 20 or the like becomes impossible. As a result, the coupling between the joint and the shafts 30, 40 without using the screw 36 is required. Concretely, if the diameter of the inner hub 20 or the like becomes less than or equal to 4φ, it will become difficult to form the screw hole 26a or the like.

FIG. 9 (b) is a view showing an example where the diameters of shafts 30, 40 are larger than the diameters of the openings 15, 25. In this case, as shown in FIG. 9 (b), first, the tips 34, 43 of the shafts 30, 40 are screw-cut such that screw holes are formed in the opening 15, 25. Then, the tips 34, 43 are coupled with the joint by screwing with the openings 15, 25. In this case, a nut is unnecessary. On the bottom face of tips 34, 43, the shaft 30 can be positioned to the outer hub 10. Of course, a nut may be used as an aid for the purpose of the robust coupling between the inner hub 20 and the shaft 40 and the robust coupling between the inner hub 10 and the shaft 30.

FIG. 9 (c) is a variation of FIG. 9 (b). Compared with the case shown in FIG. 1, there is shown an example of the coupling between the shaft 40 and the inner hub 20 where the diameter of the body 24 of the inner hub 20 was relatively made smaller. As shown, the edge of the inner hub 20 is made as a male screw and the edge of the shaft 40 is made as a female screw. Here, a nut 42 is used as an aid.

Embodiment 7

Figure 10:
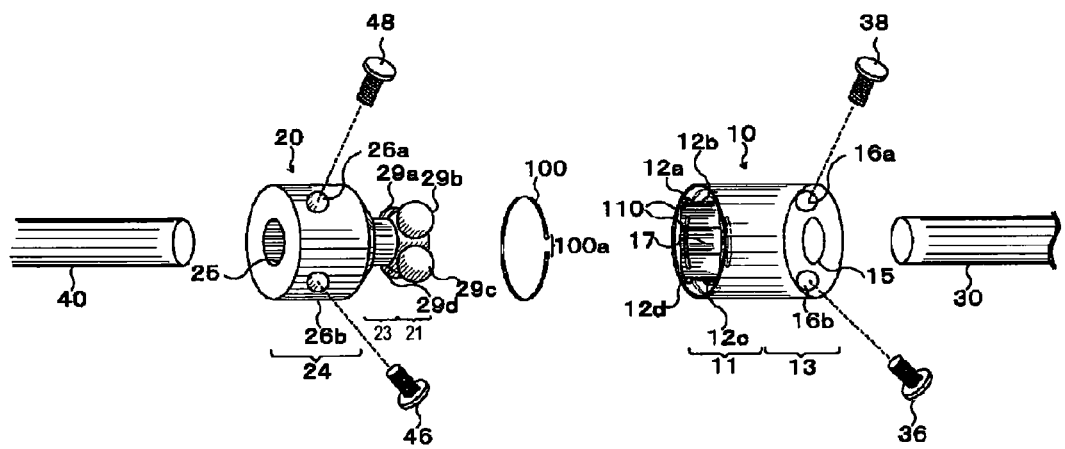
FIG. 10 is a view showing a variation of FIG. 1.

FIG. 10 is a view showing a variation of FIG. 1. In FIG. 10, a generally C-shaped ring member 100 made of stainless or the like is shown, in addition to those shown in FIG. 1. The ring member 100 is of generally C-shaped, and thus has a notch 100a. In addition, FIG. 10 shows a receiver part 110 which is formed in a direction crossing a shorter direction of the longitudinal grooves 12a-12d and receives the ring member 100.

The diameter of the ring member 100 and the diameter of the receiver part 110 are made generally equal. Thus, after the ring member 100 is embedded in the receiver part 110, the ring member is not detached unless the ring member 100 is intentionally detached from the receiver part 110.

The ring member 100 and the receiver part 110, after having coupled the inner hub 20 with the outer hub 10 once, maintain the coupling. That is, the ring member 100 and the receiver part 110 are used as alternatives to the structures illustrated in FIG. 4 and FIG. 7.

Figure 11:
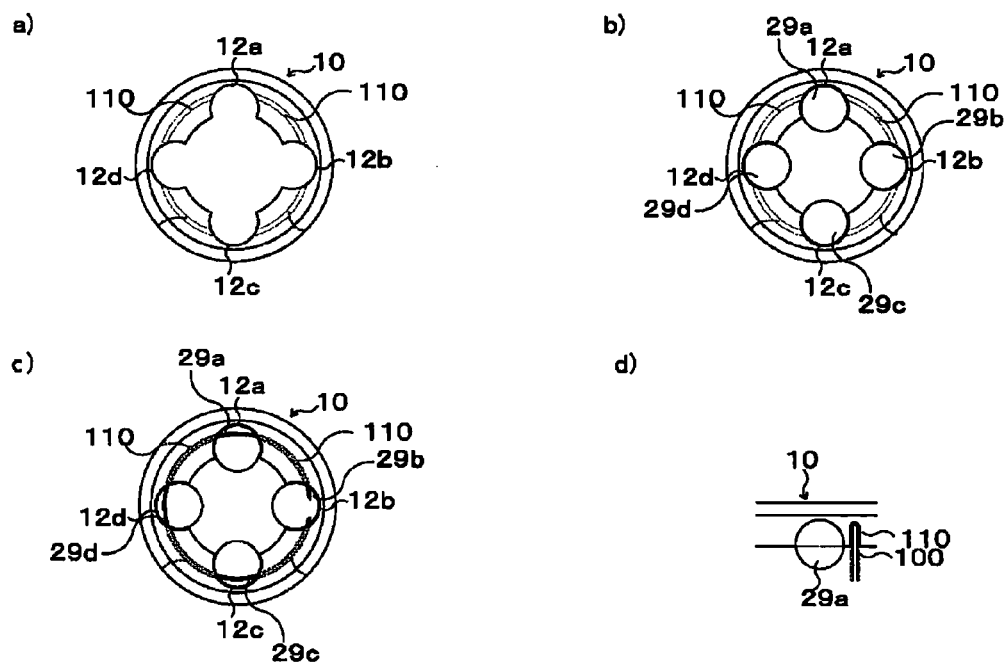
FIG. 11 (*a*) is an explanatory diagram of the assembling principle of each member shown in FIG. 10.

FIG. 11 is an explanatory diagram of the assembling principle of each member shown in FIG. 10. FIG. 11 (a)-FIG. 11 (c) show side views of the outer hub 10 seen from the receiving section 17 side. FIG. 11 (d) shows one part of the cross section of the outer hub 10.

As shown in FIG. 11 (a), the longitudinal grooves 12a-12d, as described above, are formed in the receiving section 17. In addition, the receiver part 110 is formed in the longitudinal grooves 12a-12d or the like by die casting. In fact, if the outer hub 10 is not formed by die casting, the longitudinal grooves 12a-12d or the like may be provided with the receiver part 110 by means of cutting.

As shown in FIG. 11 (b), spheres 29a-29d are received in the longitudinal grooves 12a-12d. In addition, for illustrative purposes, the inner hub 20 is not illustrated. In fact, spheres 29a-29d are received in the longitudinal grooves 12a-12d in a state received in the inner hub 20.

As shown in FIG. 11 (c), the ring member 100 is embedded in the receiver part 110. In this case, the ring member 100 is of generally C-shaped, and thus the diameter can be narrowed by applying a force in an inner diameter direction. The ring member 100 having the narrowed diameter is embedded from the receiving section 17 into the receiver part 110. Actually, when the ring member 100 arrives at the receiver part 110, the narrowed diameter expands such that the ring member 100 is fit into to the receiver part 110.

To make the ring member 110 received in the receiver part 110 by the above technique, note the following. The notch 100a needs to be formed with such a width that the diameter of the ring member 100 is smaller than that of the receiving section 17 if a force is applied to the ring member 100 in an inner diameter direction. In addition, the ring member 100 requires such hardness that the ring member 100 returns to the original shape if a force applied in an inner diameter direction is released. SUS304 can be used as an example.

As shown in FIG. 11 (*d*), since the ring member 100 embedded in the receiver part 110 acts as a stopper, the sphere 20*a* received in the outer hub 10 is not detached from the outer hub 10. In fact, the sphere 20*a* does not fall from the sphere receiver 22*a* in a state received in the outer hub 10. Therefore, the coupling between the outer hub 10 and the inner hub 20 will be maintained by the sphere 20*a*, the receiver part 110 and the ring member 100.

Embodiment 8

Figure 12:
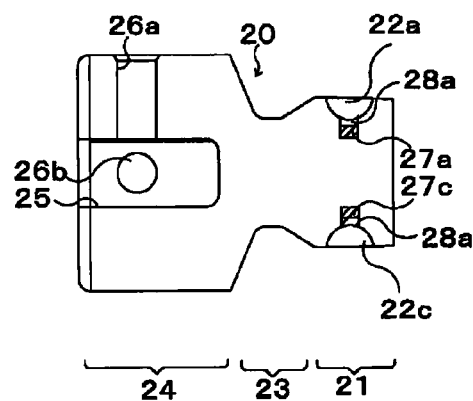
FIG. 12 is a view showing a variation of FIG. 2.

FIG. 12 is a view showing a variation of FIG. 2. FIG. 12 shows a cross section of the inner hub 20 corresponding to FIG. 2(*b*). This inner hub 20 without such a stopper as shown in FIG. 11 is suitable for coupling with the outer hub 10.

FIG. 12 shows grooves 28*a*, 28*c* formed in the bottoms of the sphere receivers 29*a*, 29*c*, and magnets 27*a*, 27*c* received in the grooves 28*a*, 28*c*, in addition to those shown in FIG. 2.

Now, if the outer hub 10 does not have a stopper, when the outer hub 10 and the inner hub 20 are coupled with each other and used, the outer hub 10 and the inner hub 20 may be mutually detached. In this case, to prevent the sphere 29*a* or the like fall from the sphere receiver 22*a* or the like, the sphere 29*a* or the like is a magnetic substance and the magnet 27*a* or the like is provided in a magnet receiver 22*a* or the like in this embodiment.

As a result, even if the outer hub 10 and the inner hub 20 are mutually detached, the sphere 29*a* or the like is adsorbed by the magnet 27*a* or the like, and not fallen from the sphere receiver 22*a*.

Explanation of Signs

10, 10': outer hub
20: inner hub
29: sphere
30, 40: shaft

The invention claimed is:

1. A joint comprising:
   a plurality of spheres;
   a member wherein hemispherical recesses for receiving the spheres are formed on a side face of a head and a cylindrical body is located adjacent to said head via a neck; and
   a hub having a receiving section for receiving the member and a plurality of longitudinal grooves which are integrally formed with said receiving section and in which the sphere received in said each recess is received,
   wherein the longitudinal grooves are formed so as to linearly extend in a longitudinal direction, and
   wherein the neck performs functions of connecting the head to the body and wherein the neck is configured to allow a curve between shafts,
   wherein the ratio of the diameter of the head and the diameter of the neck is nearly equal to 3:2, and
   wherein the head, the neck, and the body are arranged linearly.

2. The joint as claimed in claim 1, wherein in a bottom of the longitudinal grooves, the depth at an opening portion are shallower than that at a central portion.

3. The joint as claimed in claim 1, wherein the hub and a shaft coupled to said hub are threaded.

4. The joint as claimed in claim 1, wherein a diameter of the each sphere is in a range of generally ¼-⅛ of a diameter of the body.

5. The joint as claimed in claim 1, wherein a prevention part for preventing the member and the hub from detaching from each other is provided.

* * * * *